O. B. LINDQUIST.
CONICAL DISK AND METHOD OF MAKING SAME.
APPLICATION FILED APR. 22, 1919.
1,386,182.
Patented Aug. 2, 1921.
2 SHEETS—SHEET 1.
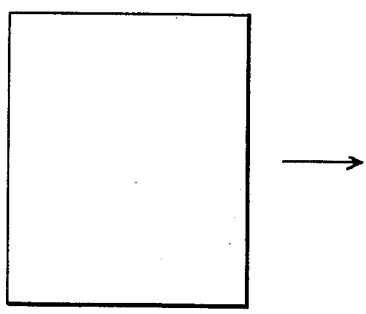
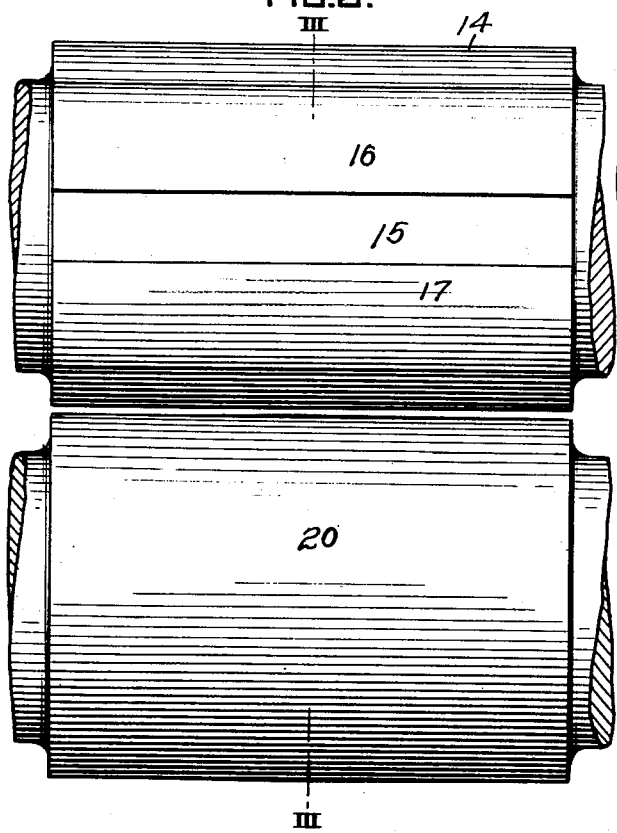
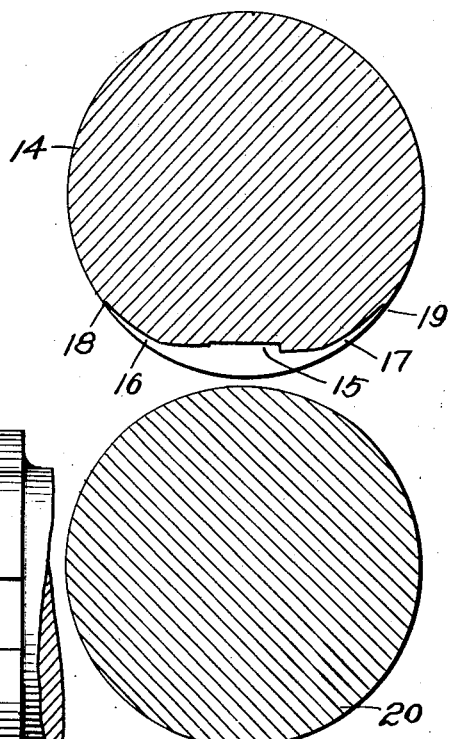
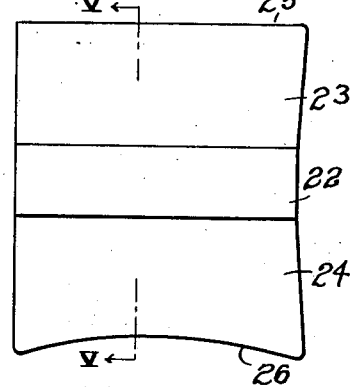
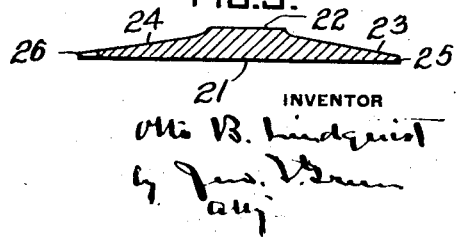

O. B. LINDQUIST.
CONICAL DISK AND METHOD OF MAKING SAME.
APPLICATION FILED APR. 22, 1919.

1,386,182.

Patented Aug. 2, 1921.

WITNESSES
J. Herbert Bradley.

INVENTOR
Otto B. Lindquist

UNITED STATES PATENT OFFICE.

OTTO B. LINDQUIST, OF TARENTUM, PENNSYLVANIA.

CONICAL DISK AND METHOD OF MAKING SAME.

1,386,182.      Specification of Letters Patent.     Patented Aug. 2, 1921.

Application filed April 22, 1919. Serial No. 291,936.

*To all whom it may concern:*

Be it known that I, OTTO B. LINDQUIST, a citizen of the United States, and a resident of Tarentum, in the county of Allegheny and State of Pennsylvania, have made a new and useful Invention in Conical Disks and Methods of Making Same, of which the following is a specification.

This invention relates to metal disk wheels and also to the art of making the same.

Metal disk wheels have for some time been used for motor vehicles and some of these have consisted of a steel disk flat on one side and the other tapered radially from a circular central boss to the wheel periphery.

In one wheel with which I am familiar in which the disk is 25 inches in diameter a central boss is provided which is 6 inches in diameter and a quarter of an inch in thickness. The boss stands $\frac{1}{16}$ of an inch above the immediately adjacent surrounding portion which where it joins the boss is $\frac{3}{16}$ of an inch in thickness, and, from the boss to the wheel periphery the disk tapers in thickness in all radial directions to $\frac{3}{32}$ of an inch. The disk on the opposite side from the boss is flat.

Heretofore, or before my invention, the only commercial way of forming these disk wheels has been to machine them from a flat forged metal disk, or to partially finish them by forging and then to machine them to size and shape, but these methods, as will be apparent, are expensive.

An object of this invention is to provide a disk for wheels of the above type which is finished to dimension solely by die or roller forging.

A further object is to provide a method whereby these, or similar disks, can be cheaply and quickly rolled or roller forged to accurate measurement thus doing away with costly machine operations.

A still further object is to provide a method whereby with a minimum number of passes or operations a flat metal blank (preferably a rolled blank) may be roller forged into a blank having a relatively flat truncated conical area impressed thereon suitable for the production by shearing or other trimming of disks of the form of relatively flat truncated cones.

These, as well as other objects which will readily appear to those skilled in this particular art, I attain by the method described in the specification and, more or less, diagrammatically illustrated in the drawings accompanying and forming a part of this application in which Figure 1 is a plan of a metal blank such as I prefer to use in the first pass or operation when the disk is finished in two passes.

Fig. 2 is a front view in elevation of a two high stand of rolls such as utilized in the first pass or rolling operation of the two pass method.

Fig. 3 is a sectional elevation of said rolls taken on line III—III of Fig. 2.

Fig. 4 is a plan of the blank as it emerges from the first pass in the two pass method.

Fig. 5 is a sectional elevation of the blank shown in Fig. 4, taken on line V—V of Fig. 4.

Figure 7:
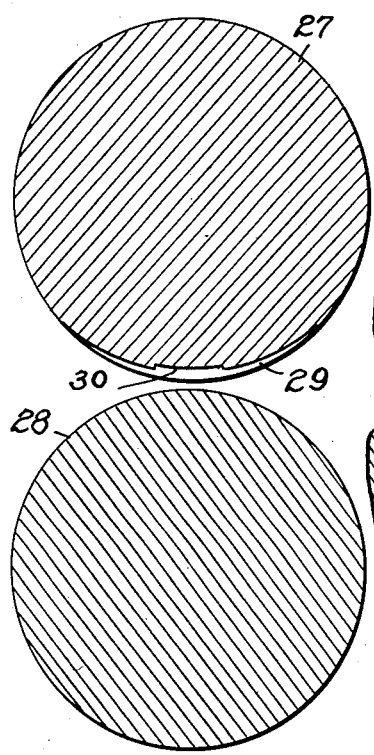
Fig. 7 is a sectional elevation of the rolls of Fig. 6 taken on line VII—VII of said figure.
Figure 6:
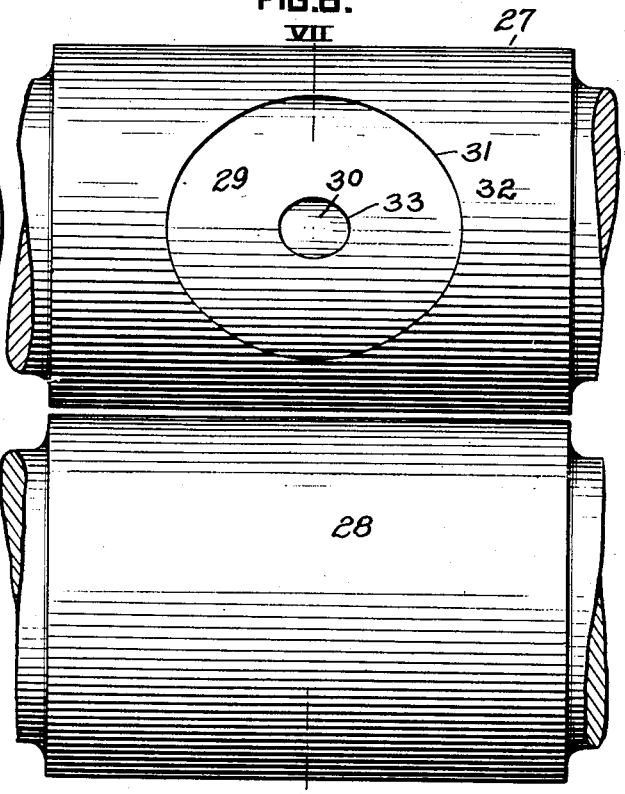
Fig. 6 is a front view in elevation of a two high stand of rolls utilized in the second pass or rolling operation.

For the purpose of distinctly setting forth this invention I have chosen as a typical disk the one above set forth, and in producing this in accordance with this invention (utilizing but two passes) I take a quarter inch steel plate 20 x 24" and after heating the same to approximately a red heat I enter one of its long sides between the rolls of the first pass. The upper or die roll 14 of the first pass, as illustrated in Figs. 2 and 3, is formed with a matrix having a central depression 15 which extends from one end of the roll body to the other and side portions 16 and 17 which in general increase in depth from the front margin 17 and rear margin to the central depression 15. As shown in Fig. 3 the entering side 18 of the matrix differs slightly from the leaving side as my experiments have shown that this easing off is desirable.

The bottom roll 20 of the pair utilized in the first pass is the driven roll. Roll 20 is cylindrical in cross section and is slightly cambered or $\frac{1}{32}$ of an inch greater in diameter at its center than at its ends.

In entering the blank for the first pass it is necessary to see that it is so entered with relation to the matrix that the center of the design impressed thereon will lie at the center of the elongated blank as it emerges from the first pass; it being understood that the blank is elongated during the rolling operation.

The blank after it emerges from the first pass is flat on one side 21 and on the other side is provided with a laterally extending flat portion 22 at its center and portions 23 and 24 which taper in thickness from the center portion 22 to the front and rear edges 25 and 26, respectively. The blank as it emerges from the first pass neglecting the fins is approximately 20 x 27½".

For the second pass or operation the pair of rolls consists of a die or matrix roll 27 and a plain cylindrical roll 28; roll 28 being the driven roll. Die roll 27 is provided with a matrix 29 which is elliptical when developed and which is preferably 23½ x 25" with an elliptical sub-depression 30 at its center approximately 5 x 6". The matrix at its perimeter or marginal edge 31 is $\frac{3}{32}$ of an inch below the surrounding surface 32 of the roll face and at the perimeter 33 of the sub-matrix 30 the main matrix is $\frac{3}{16}$ of an inch in depth. The bottom of sub-matrix 30 is a quarter of an inch below the face 32 of the roll.

The minor axis of the matrix extends circumferentially of the roll 27 and is of such length that the portion embossed thereof will be circular instead of rectangular as it emerges from the pass, due to the elongation of the blank. The major axis of the matrix extends longitudinally of roll 27 and is of the same length as the diameter of the circular embossed portion as it emerges from the pass.

For the second pass or operation, blank 23, as illustrated in Figs. 4 and 5, is turned 90° in a horizontal plane as it emerges from the first pass and is entered between the rolls for the second pass. That is, the blank in passing through the rolls of the second pass is at right angles to its travel through the rolls of the first pass. In entering it between the rolls for the second pass the raised central portion 22 must line up with sub-matrix 33 and the blank must be fed to the rolls so that the raised boss forged by sub-matrix 33 will lie substantially at the center of the elongated blank as it emerges from the second pass.

Figure 8:
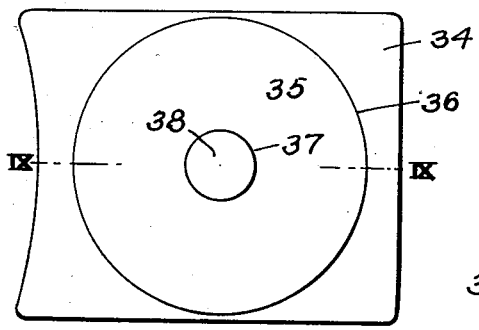
Fig. 8 is a plan of the blank as it emerges from the second pass.
Figure 10:
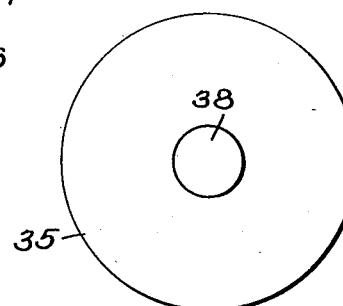
Fig. 10 is a plan of the finished disk after the superfluous metal shown in Figs. 8 and 9 has been removed by shearing or otherwise.
Figure 11:
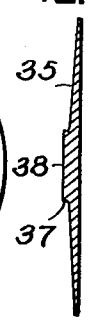
Fig. 11 is a sectional elevation of the disk shown in Fig. 10 taken on any diametral line of the disk shown in Fig. 10.
Figure 9:
Fig. 9 is a sectional elevation of the blank shown in Fig. 8 taken on line IX—IX of said figure.

The blank as it appears after the second pass is illustrated in Figs. 8 and 9 in which blank 34 which throughout its marginal portions is substantially $\frac{3}{32}$ of an inch in thickness has embossed thereon a circular area 35 which tapers in thickness from its margin 36 increasingly to $\frac{3}{16}$ of an inch in thickness at 37 which represents the periphery of the raised cylindrical central boss 38. After the blank has been finished in the second pass the marginal portions outside of circular area 35 are trimmed away by shearing or otherwise to form a disk having the boss 38 located at its center.

I have found that by this method I can obtain flat disks of tapered sections or, more specifically, disks that approximate or resemble relatively flat truncated cones each having a cylindrical central projection or boss raised above the immediately adjacent surface and that these can be rolled to dimension suitable for use in the manufacture of disk wheels without machining the base or conical surface. The entire surface of the base and the entire conical surface therefor evidence roller or die forging, since the dense skin due to the die or roller forging remains intact in the finished product.

It will be understood that while I have given dimensions in the specification these are merely to serve as a guide and are not given with any idea of limiting this invention to the dimensions given.

Having thus described my invention what I claim is—

1. The method of forming a radially tapered circular plate which consists in roller forge beveling a blank in opposite directions, then in roller forge beveling said blank equally in all radial directions.

2. The method of forming a radially tapered circular plate which consists in roller forge beveling said blank in opposite directions, then in roller forge beveling a blank equally in all radial directions, then in trimming the blank to form a disk.

3. That step in the art of rolling relatively flat truncated cones, which consists in passing a heated forged metal blank between a pair of rolls and thereby impressing upon said blank a conically formed raised portion bounded by a relatively flat area, then in trimming off said flat area.

4. That step in the art of rolling circular metal disks which consists in subjecting a partially finished disk to the action of rolling dies, one of which is provided with an elliptical matrix, the minor axis of which extends circumferentially of the roll, while the major axis extends longitudinally of the roll and is substantially equal in length to the desired diameter of the finished disk.

5. That step in the art of rolling relatively flat truncated conical disks which consists in passing a partially finished disk between rolls, one of which is provided with an elliptical matrix, the major axis of which is substantially equal in length to the desired diameter of the finished disk and which extends longitudinally of the roll.

6. The step of die finishing relatively flat truncated conical disks which consists in subjecting a partially finished disk to the action of a rolling matrix of elliptical form and having its minor axis extending in the same direction as the metal of the disk flows during the forging operation.

In testimony whereof, I have hereunto subscribed my name this 16th day of April, 1919.

OTTO B. LINDQUIST.